United States Patent
Dyck et al.

(10) Patent No.: US 6,829,693 B2
(45) Date of Patent: Dec. 7, 2004

(54) AUXILIARY STORAGE SLOT SCAVENGER

(75) Inventors: Greg A. Dyck, Poughkeepsie, NY (US); Harris M. Morgenstern, Wappingers Falls, NY (US); Danny R. Sutherland, Poughkeepsie, NY (US); Wendy L. Wang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 09/795,426

(22) Filed: Feb. 28, 2001

(65) Prior Publication Data

US 2002/0120808 A1 Aug. 29, 2002

(51) Int. Cl.[7] .............................................. G06F 12/00
(52) U.S. Cl. ........................ 711/206; 711/156; 711/162
(58) Field of Search ................................ 711/156, 161, 711/162, 205, 206, 203, 207

(56) References Cited

U.S. PATENT DOCUMENTS

| | | | |
|---|---|---|---|
| 4,577,274 A | | 3/1986 | Ho et al. |
| 4,967,353 A | * | 10/1990 | Brenner et al. ............. 711/160 |
| 5,388,242 A | | 2/1995 | Jewett |
| 5,392,415 A | * | 2/1995 | Badovinatz et al. ........ 709/100 |
| 5,394,539 A | * | 2/1995 | Neuhard et al. ............ 711/209 |
| 5,426,752 A | * | 6/1995 | Takahasi et al. ............ 711/209 |
| 5,617,552 A | | 4/1997 | Garber et al. |
| 5,699,539 A | | 12/1997 | Garber et al. |
| 5,809,564 A | | 9/1998 | Craze et al. |
| 5,870,537 A | | 2/1999 | Kern et al. |
| 6,574,706 B2 | * | 6/2003 | Sutherland et al. ......... 711/117 |
| 6,574,718 B2 | * | 6/2003 | Sutherland et al. ......... 711/159 |
| 2002/0120807 A1 | * | 8/2002 | Sutherland et al. ............ 711/6 |
| 2002/0120821 A1 | * | 8/2002 | Sutherland et al. ......... 711/159 |

OTHER PUBLICATIONS

IBM Technical Disclosure Bulletin: Data Integrity Within EDAM; Jan. 1982; vol. 24, Issue 8, pp. 4224–4226.*
IBM Technical Disclosure Bulletin: Release Page Services; Sep. 1974; vol. 17, Issue 4, pp. 1082–1085.*

* cited by examiner

Primary Examiner—Reba I. Elmore
(74) Attorney, Agent, or Firm—Scully, Scott, Murphy & Presser; William A. Kinnaman, Jr., Esq.

(57) ABSTRACT

In a computing system implementing a virtual memory system having real memory storage frames for storing virtual pages of data and an auxiliary storage system comprising auxiliary storage slots for storing copies of corresponding virtual pages provided in real storage frames, a system and method for freeing auxiliary storage slots to enable further copying of pages thereto. The method comprising the steps of: a) traversing a queue of page frame table entries indicating presence and location of virtual page data in the real storage system; b) determining from the real storage frame backing a page whether the page has been changed in the real storage, and in response, determining whether the page is backed in a corresponding slot in auxiliary storage; c) identifying the auxiliary slot corresponding to the changed frame; and, b) removing the virtual page in said corresponding slot in said auxiliary storage, wherein further room is made available in said auxiliary storage for accommodating storage of other virtual page entries.

21 Claims, 6 Drawing Sheets

AUXILIARY STORAGE SLOT SCAVENGER

BACKGROUND OF THE INVENTION

1. Field of the Invention

This invention relates generally to virtual memory storage systems for mini and mainframe computing systems, and particularly, to a novel system for efficiently freeing up auxiliary storage slots for storing virtual pages.

2. Discussion of the Prior Art

Virtual memory management schemes enable a computer system to present a large address space, larger than the amount of real storage on the system. A virtual memory management scheme consists of a mapping of an address space which provide a means of translating a virtual address of a page into a real address of a frame. A frame is the basic unit by which real storage is managed in a computer system. For example, in z/Architecture a frame consists of 4096 bytes.

Since real storage is a limited resource, when the operating system determines that it has become scarce it may try to write the data on some real frames to auxiliary storage, also called a direct access storage device (DASD) which is cheaper and more plentiful, but much slower to access. This operation is known as paging and involves initiating output device I/O to auxiliary storage. The operating system makes paging decisions at a global level and a local level. At the global level, the operating system determines which address spaces will suffer a potential performance penalty of having their data paged out to auxiliary storage. At the local level, the operating system determines which frames within an address space are good candidates to be paged to auxiliary storage. In general, frames which are least recently used are better candidates to be paged to auxiliary storage since they have a lower likelihood of being referenced in the near future. Computer systems, including z/Architecture, provide facilities to approximate least recently used (LRU) order. Part of the facility is the Referenced bit which is associated with each frame of storage in z/Architecture. The Referenced bit is turned on by the hardware whenever a frame of storage is referenced or changed. A separate bit called the Changed bit is turned on by the hardware whenever a frame is changed. z/Architecture also provides an instruction called Reset Reference Bit Extended (herein referred to a RRBE) which sets the Referenced bit to zero and sets a condition code which provides an indication of whether the frame was changed and/or referenced. The z/OS operating system maintains a data structure, known as the Page Frame Table Entry (or PFTE) which includes data corresponding to a single frame. The aggregate of PFTEs is referred to as the PFT or Page Frame Table. PFTEs corresponding to frames used for a particular address space are placed on a queue. Periodically, this queue of PFTEs is traversed and the RRBE instruction is used to determine whether the frame is referenced; PFTEs corresponding to frames that have been referenced are moved to the back of the queue. This traversal of the PFTE queue is known as Unreferenced Interval Count Update (or UIC Update).

The act of writing real frames in use by an address space to auxiliary storage to replenish the number of available frames is referred to as stealing. When an address space is selected for stealing, steal candidates are selected by traversing the PFTE queue from the front to the back, in least recently used (LRU) order.

As known, a page may exist in the following states:
a first state (1) where a virtual page is not backed in either real storage 20 or auxiliary storage 30 (as illustrated in FIG. 1); a second state (2) where a virtual page is backed by an unchanged frame 9 that contains zeros (0,0, . . . ) as illustrated in FIG. 2. Backing refers to a virtual storage concept where a frame or auxiliary "slot" includes the data that a virtual address refers to; a third state (3) where a virtual page 10 exists only in real storage 20 and unchanged as illustrated in FIG. 3; a fourth state (4) where the page is backed in real and changed; a fifth state (5) where a virtual page 10 is copied from real storage 20 to auxiliary storage 30 so the frame corresponding to the real storage can be used for other pages as illustrated in FIG. 4; a sixth state (6) where a virtual page 10 exists (is backed) only on auxiliary storage 30 as illustrated in FIG. 5; a seventh state (7) where a virtual page 10 is needed so a copy of the page is read in (i.e., copied) into real storage 20 from auxiliary storage 30 as illustrated in FIG. 6; an eighth state (8) where a virtual page 10 in real storage is unchanged (backed) and matches a copy on the auxiliary storage 30 as illustrated in FIG. 7; and, a ninth state (9) where a virtual page 11 in real storage 20 is changed and the copy 10 on the auxiliary storage 30 is no longer valid and usable as illustrated in FIG. 8.

When data is stored into a page, the page transitions from either initial state, e.g., (1), (2) or (3) to a state (4). The act of writing real frames in use by an address space to auxiliary storage (i.e., stealing) causes the page to transition to a state (5) and when the output I/O completes, the page is transitioned to state (6). When the page is subsequently referenced or changed, it is read into real storage from auxiliary storage which is a state (7). When the input I/O completes, the page is in state (8) and if the page is changed, the page transitions to state (9).

It should be understood that states (8) and (9) differ from the others in that the page is backed by two different units of storage: a real frame and an auxiliary storage slot. In state (8) the real frame and the auxiliary storage slot contain the same data. In this state the frame may be stolen without having to go through the overhead of initiating output I/O to page the data to auxiliary storage since a copy already exists on auxiliary storage. In state (9), however, there is no value in maintaining a down level copy of the data on auxiliary storage and such auxiliary storage slots should be returned to the available pool (the page should transition to state (4)).

It would thus be highly desirable to provide an operating system that may prevent auxiliary storage shortages by periodically freeing auxiliary storage slots that back pages that are also backed in real where the copy in real has been changed from the copy on auxiliary storage (i.e. state 9).

SUMMARY OF THE INVENTION

It is an object of the present invention to provide a means by which an operating system may prevent auxiliary storage shortages by periodically freeing auxiliary storage slots that back pages being read in from auxiliary storage (i.e., state 7).

According to the principles of the invention, there is provided for a computing system implementing a virtual memory system having real memory storage frames for storing virtual pages of data and an auxiliary storage system comprising auxiliary storage slots for storing copies of corresponding virtual pages provided in real storage frames, a system and method for freeing auxiliary storage slots to enable further copying of pages thereto, the method comprising the steps of: a) traversing a queue of page frame table entries indicating presence and location of virtual page data in the real storage system; b) determining from the real storage frame whether a virtual page has been changed in the real storage, and in response, determining whether the page is backed in a corresponding slot in auxiliary storage; c) identifying the auxiliary slot corresponding to the changed frame; and, d) removing the virtual page in said corresponding slot in said auxiliary storage, wherein further room is made available in said auxiliary storage for accommodating storage of other virtual page entries.

Particularly, the invention includes, in addition to normal PFTE table traversal and steal processing, the checking of a condition code of the RRBE (reset referenced bit extended) instruction to determine whether the frame is changed and if so, whether there is an auxiliary storage slot associated with the page that the frame is associated with. If such a slot is found, an attempt is made to free the auxiliary slot.

Advantageously, the auxiliary slot scavenger system of the invention is implementable on any computing system implementing virtual memory storage that that maintains a set of frame steal candidates in approximate LRU (least recently used) order.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

In a large computing system such as the IBM z/OS, pages may be backed in real storage, auxiliary storage, or both.

When a page is "faulted in" from auxiliary storage, the computing system may keep the auxiliary slot for the corresponding page (state (8)). Thus, if the page is never subsequently changed but is later stolen, steal processing could avoid the overhead of performing output I/O and simply take the frame, leaving the copy in auxiliary storage as the only copy of the data. The problem with this protocol is that the auxiliary storage slot is still owned by the page, even when the page is changed in the real storage. This increases the likelihood of running into an auxiliary storage shortage.

Any such system must periodically process real storage to determine whether the storage has been referenced since the last time it has been processed and if so, make the frame a less desirable steal candidate. As mentioned, in the z/OS system, for example, this process is known as UIC (Unreferenced Interval Count) update. UIC update exploits the RRBE (reset reference bit extended instruction) which, besides resetting the reference bit associated with the frame, returns a condition code which indicates whether the frame is referenced and/or changed. In the case where the frame is referenced, the frame's UIC value is set, e.g., to zero, to indicate when the frame was last referenced.

When a UIC update is performed, each PFTE that is in use for a particular address space is processed to determine whether its corresponding frame has been referenced. If the corresponding frame has been referenced, the PFTE is moved to the back of the PFTE queue.

Figure 1:
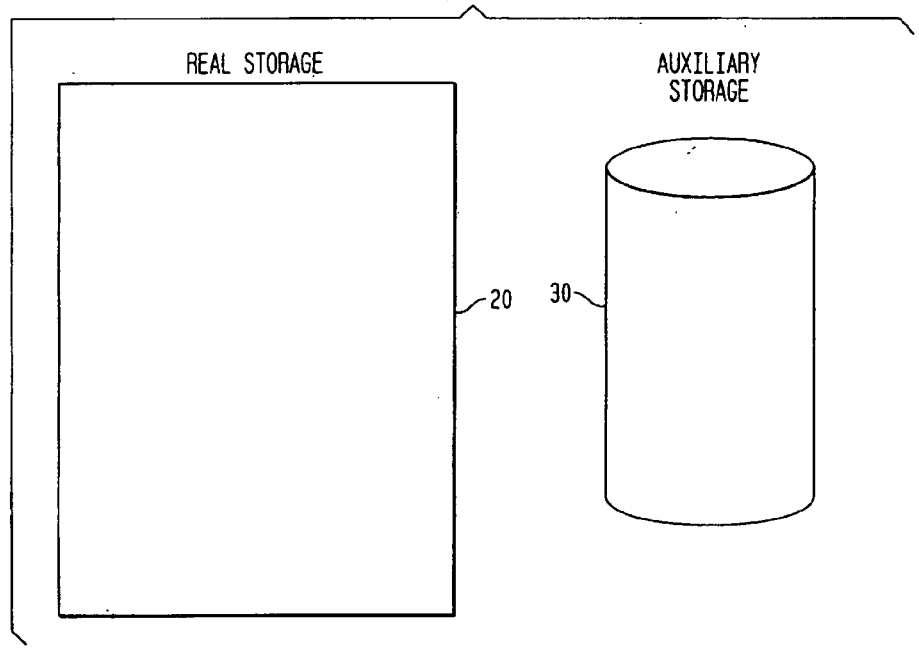
FIG. 1 is a block diagram depicting the existence of a virtual page that is not backed in either real storage or auxiliary storage.
Figure 2:
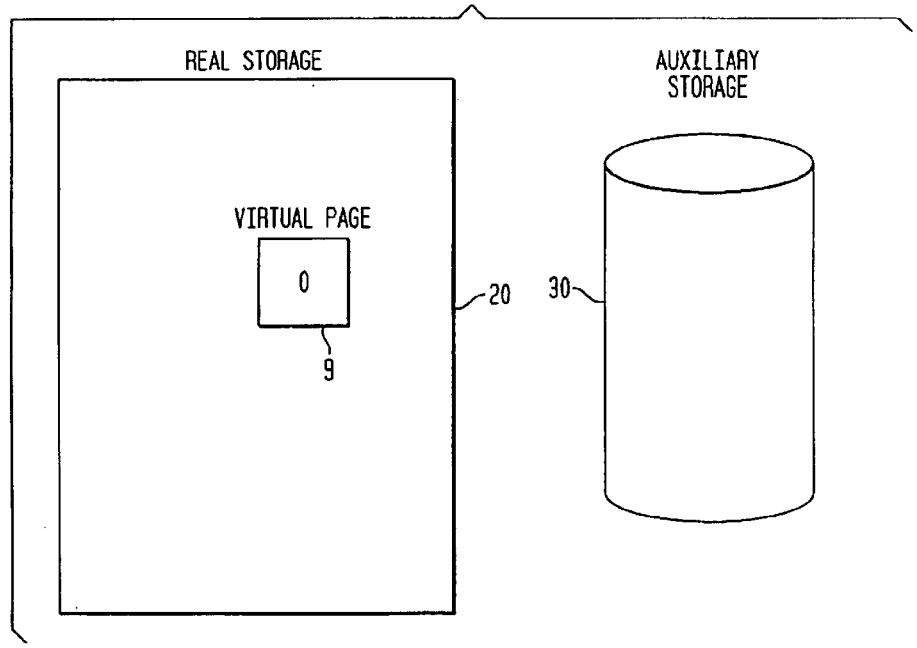
FIG. 2 is a block diagram depicting the existence of a virtual page that is backed by a frame that is unchanged, containing zeros.
Figure 3:
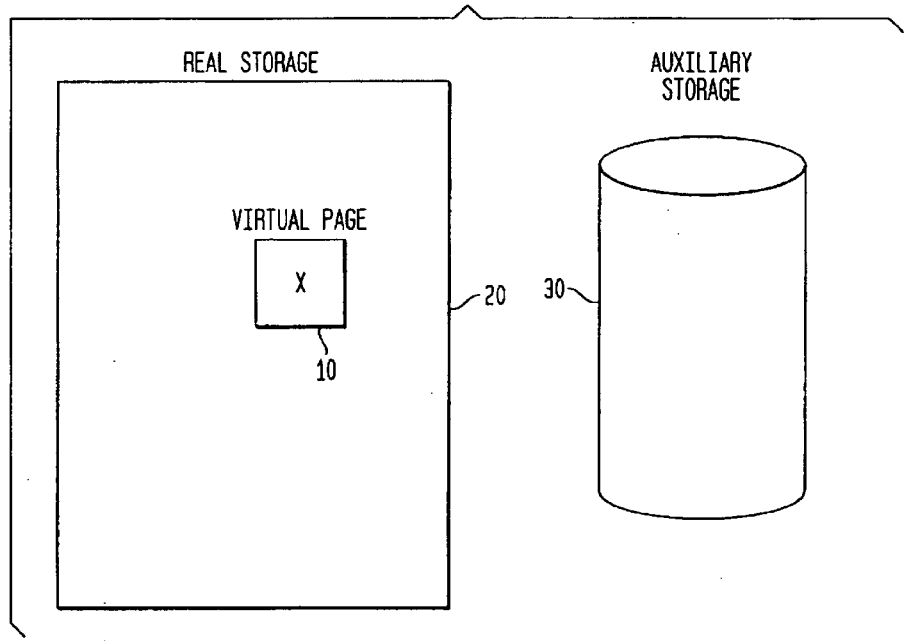
FIG. 3 is a block diagram depicting the existence of a virtual page only in real storage in a conventional virtual memory storage system.
Figure 4:
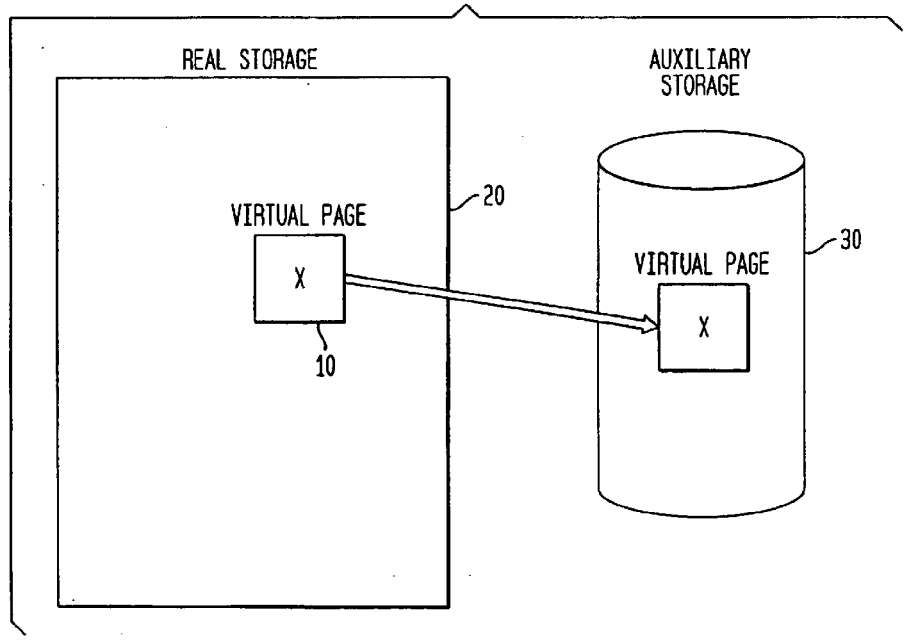
FIG. 4 is a block diagram depicting the copying of a virtual page to an auxiliary storage so that a frame of real storage may be used to store other pages in a conventional virtual memory storage system.
Figure 5:
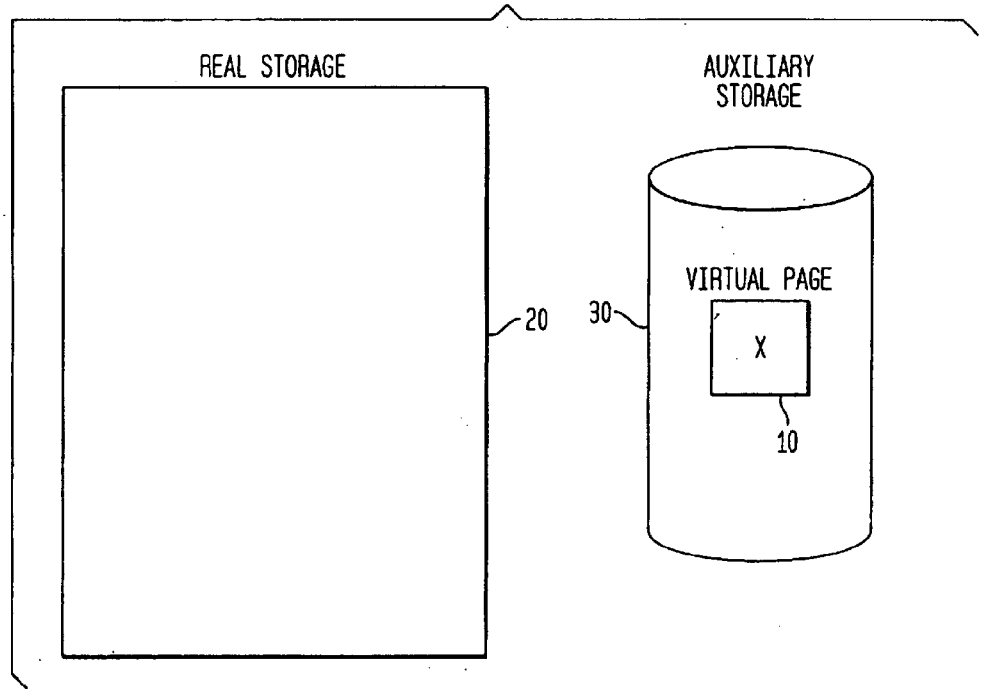
FIG. 5 is a block diagram depicting the existence of a virtual page only on auxiliary storage in a conventional virtual memory storage system.
Figure 6:
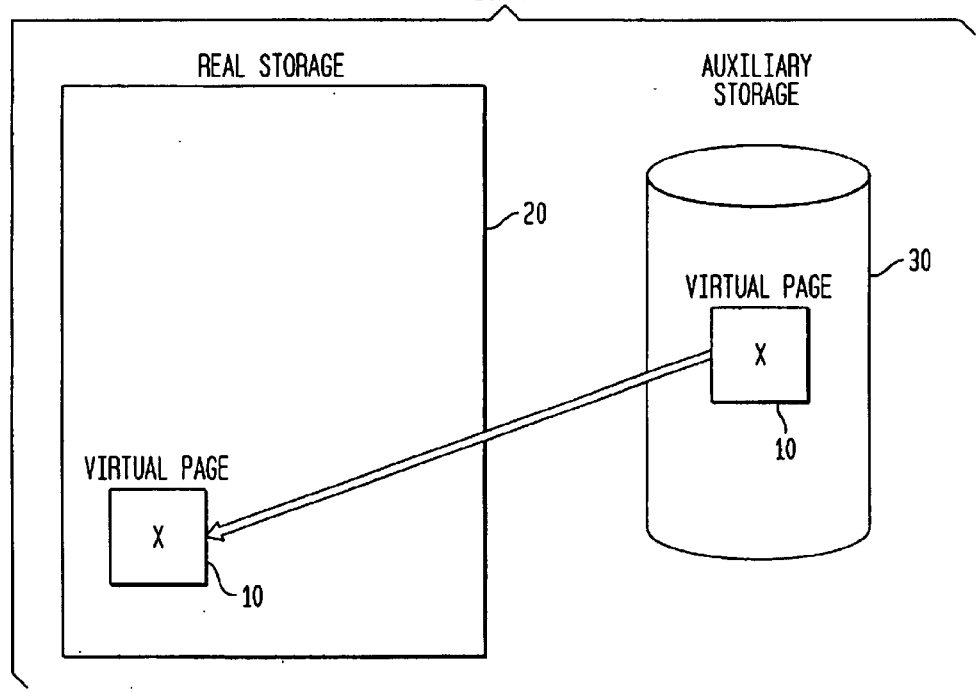
FIG. 6 is a block diagram depicting the copying of a virtual page from auxiliary storage to real storage when a virtual page is needed in a conventional virtual memory storage system.
Figure 7:
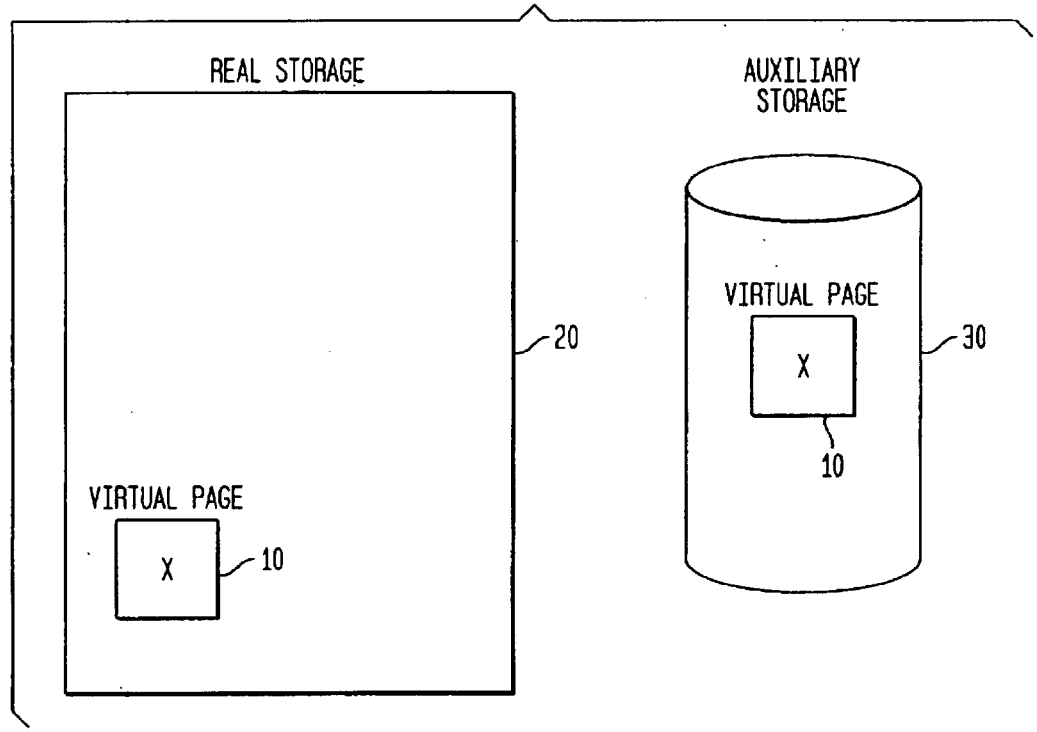
FIG. 7 is a block diagram depicting the existence of matched copies of a virtual page in both real and auxiliary storage in a conventional virtual memory storage system.
Figure 8:
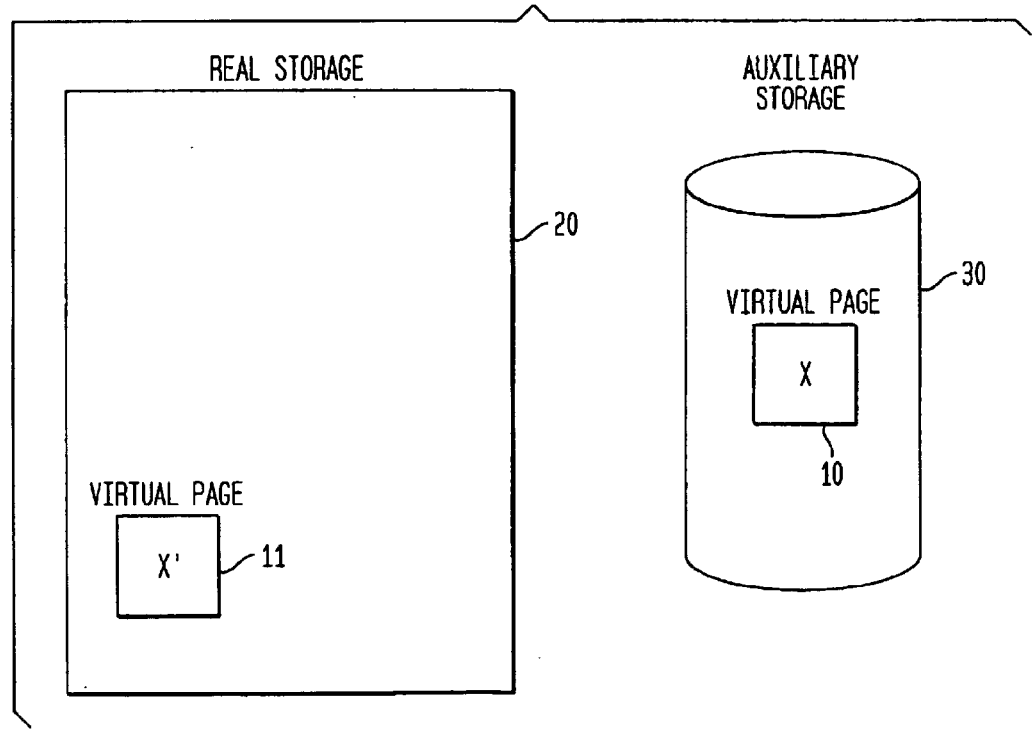
FIG. 8 is a block diagram depicting the existence of copies of a virtual page in both real and auxiliary storage, and where the copy on the auxiliary storage is no longer valid and usable in a conventional virtual memory storage system.
Figure 9:
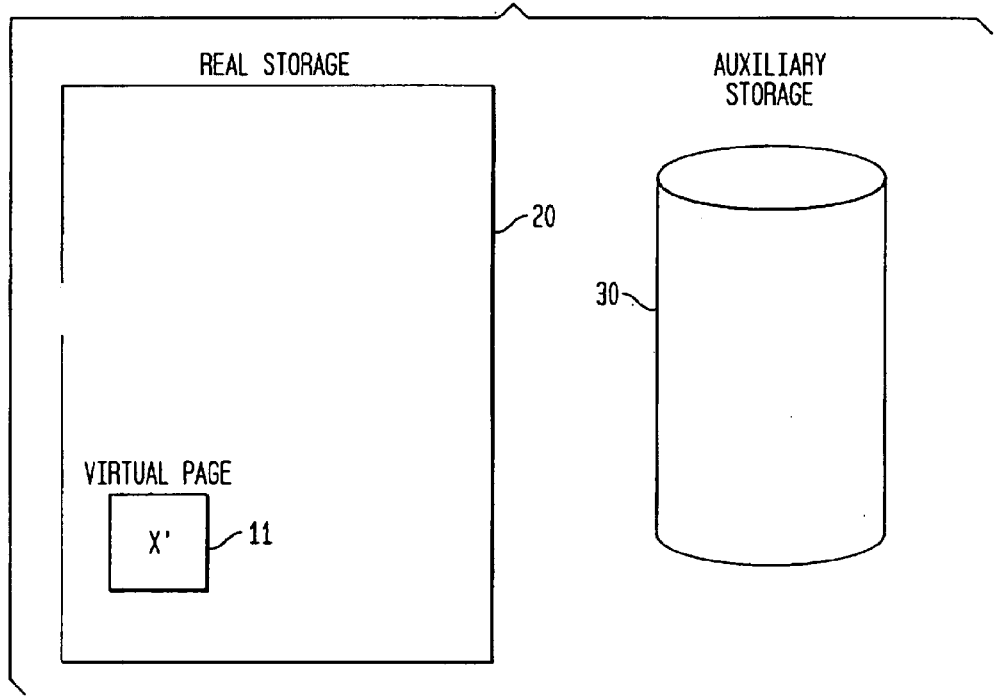
FIG. 9 depicts the state of the page whereby the copy of a page is freed from auxiliary storage and the space in auxiliary storage is now available for use in accordance with the invention.
Figure 10:
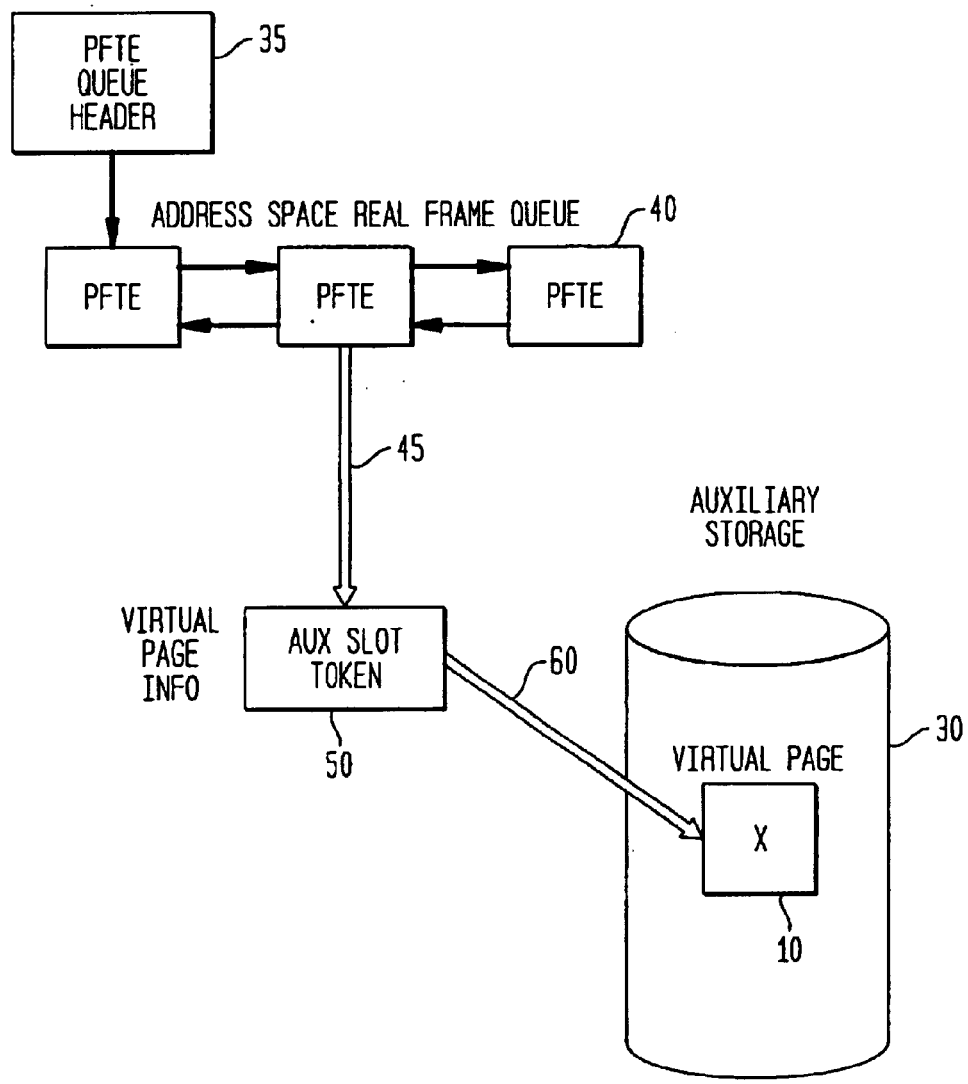
FIG. 10 illustrates the process implemented for identifying the auxiliary slot corresponding to the changed frame which may be freed accordance to the invention.

According to the invention, the RRBE instruction implemented to determine whether the frame was referenced, is now additionally used to determine whether the frame is changed. If the frame is changed (regardless of whether it has been referenced), data in the PFTE is used to locate the external page information. In a computing system such as the z/OS, this is referred to as the PTEX (Page Table Entry External) which indicates whether the page is also backed on auxiliary storage. FIG. 10 illustrates the process implemented for identifying the auxiliary slot corresponding to the changed frame which may be freed. Preferably, as shown in FIG. 10, a PFTE queue header 35 is implemented for traversing each entry in the PFTE queue 40. After passing through the queue 40, if it is determined that the referenced frame is changed, data 45 in the PFTE 40 is used to locate the external page information 50 located in the PTEX table for retrieving the unique token 60 that identifies the auxiliary slot. It is understood that this token had been previously entered into the PTEX table by an auxiliary storage manager (not shown) at the time the slot was allocated for auxiliary storage backup. Particularly, this token 60 is read from the PTEX and the operating system uses the token to identify the slot and delete its contents to thus free the auxiliary slot. FIG. 9 depicts the final state of the page whereby the copy of a page is freed from auxiliary storage and the space in auxiliary storage is now available for use.

The actual freeing of auxiliary slots may be a time consuming operation relative to UIC update since special serialization may need to be obtained to serialize the auxiliary storage manager (not shown). Such a delay could impact the ability of UIC update to maintain the queue in approximate LRU order. In this case only a small subset of the auxiliary slots that could be freed in any single UIC update pass may be freed. Since UIC update runs periodically, it will eventually free the slots that it was unable to free on some subsequent pass.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. In a computing system implementing a virtual memory storage system having real memory storage frames for storing virtual pages of data, and an auxiliary storage system comprising auxiliary storage slots for storing copies of corresponding virtual pages provided in real memory storage frames, a system for freeing the auxiliary storage slots to enable further copying of virtual pages of data thereto, the system comprising:

mechanism for periodically traversing a queue of page frame table entries indicating presence and location of the virtual pages of data in the virtual memory storage system;

mechanism, responsive to the traversing mechanism, for determining whether at least one of the virtual pages of data that is backed in at least one of the real memory storage frames has been changed in the virtual memory storage system, and in response to determining that the at least one of the virtual pages of data has been changed in the virtual memory storage system, determining whether a no longer valid copy of the at least one of the virtual pages of data is backed in at least one of the auxiliary storage slots;

mechanism, responsive to the determining mechanism, for identifying the at least one of the auxiliary storage slots which backs the no longer valid copy, when it is determined that the at least one of the virtual pages of data has been changed and the no longer valid copy is backed in the at least one of the auxiliary storage slots; and, mechanism, responsive to the identifying mechanism, for deleting the no longer valid copy from the at least one of the auxiliary storage slots, when it is determined that the at least one of the virtual pages of data has been changed and the no longer valid copy is backed in the at least one of the auxiliary storage slots, thereby freeing the at least one of the auxiliary storage slots for use in a pool of available auxiliary storage slots.

2. The system for freeing auxiliary storage slots as claimed in claim 1, wherein the page frame table entries include information indicating referenced virtual pages of data, the traversing further comprises determining whether a stored virtual page of data in at least one of the real memory storage frames has been referenced since a prior time the stored virtual page of data has been processed and, if so, placing at least one corresponding page frame table entry at a back of the queue so that the stored virtual page of data, becomes a less desirable candidate to have its contents written to the auxiliary storage system in a steal operation.

3. The system for freeing auxiliary storage slots as claimed in claim 2, wherein said queue of page frame table entries is maintained in least recently used order.

4. The system for freeing auxiliary storage slots as claimed in claim 1, further comprising a mechanism for providing a condition code indicating whether the at least one of the virtual pages of data that is backed in the at least one of the real memory storage frames has changed.

5. The system for freeing auxiliary storage slots as claimed in claim 1, wherein the page frame table entries include information indicating whether the at least one of the virtual pages of data is backed in the at least one of the auxiliary storage slots.

6. The system for freeing auxiliary storage slots as claimed in claim 1, wherein the identifying mechanism includes a mechanism for retrieving an auxiliary slot token that identifies the at least one of the auxiliary storage slots.

7. The system for freeing auxiliary storage slots as claimed in claim 1, wherein the determining mechanism determines a plurality of the virtual pages of data that are backed by the real memory storage frames, that have been changed in the virtual memory storage system, and for which no longer valid copies are backed in a plurality of the auxiliary storage slots, and the deleting mechanism deletes only a subset of the no longer valid copies from a subset of the plurality of the auxiliary storage slots in a single traversal of the queue, and remaining ones of the no longer valid copies are deleted from remaining ones of the plurality of the auxiliary storage slots in at least one subsequent traversal of the queue.

8. In a computing system implementing a virtual memory storage system having real memory storage frames for storing virtual pages of data and an auxiliary storage system comprising auxiliary storage slots for storing copies of corresponding virtual pages provided in real memory storage frames, a method for freeing the auxiliary storage slots to enable further copying of virtual pages of data thereto, the method comprising the steps of:

a) periodically traversing a queue of page frame table entries with each entry indicating presence and location of the virtual pages of data in the virtual memory storage system; and during each traversal:

b) responsive to the traversing, determining whether at least one of the virtual pages of data that is backed in at least one of the real memory storage frames has been changed in the virtual memory storage system, and in response to determining that the at least one of the virtual pages of data has been changed in the virtual memory storage system, determining whether a no longer valid copy of the at least one of the virtual pages of data is backed in at least one of the auxiliary storage slots;

c) responsive to the determining, identifying the at least one of the auxiliary storage slots which backs the no longer valid copy, when it is determined that the at least one of the virtual pages of data has been changed and the no longer valid copy is backed in the at least one of the auxiliary storage slots; and, d) responsive to the identifying, deleting the no longer valid copy from the at least one of the auxiliary storage slots, when it is determined that the at least one of the virtual pages of data has been changed and the no longer valid copy is backed in the at least one of the auxiliary storage slots, thereby freeing the at least one of the auxiliary storage slots for use in a pool of available auxiliary storage slots.

9. The method for freeing auxiliary storage slots as claimed in claim 8, wherein the page frame table entries include information indicating referenced virtual pages of data, the traversing step further comprising the steps of:

determining whether a stored virtual page of data in at least one of the real memory storage frames has been referenced since a prior time the stored virtual page of data has been processed; and, if so, placing at least one corresponding page frame entry at a back of the queue so that the stored virtual page of data, becomes a less desirable candidate to have its contents written to the auxiliary storage system in a steal operation.

10. The method for freeing auxiliary storage slots as claimed in claim 9, further including the step of maintaining the queue of page frame table entries in least recently used order.

11. The method for freeing auxiliary storage slots as claimed in claim 8, wherein the determining step b) further includes the step of executing an instruction for providing a condition code indicating whether the at least one of the virtual pages of data that is backed in the at least one of the real memory storage frames has changed.

12. The method for freeing auxiliary storage slots as claimed in claim 8, wherein the step b) further includes the step of providing information in the page frame table entries for indicating whether the at least one of the virtual pages of data is backed in the at least one of the auxiliary storage slots.

13. The method for freeing auxiliary storage slots as claimed in claimed 8, wherein the identifying step c) further includes the step of retrieving an auxiliary slot token that identifies the at least one of the auxiliary storage slots.

14. The method for freeing auxiliary storage slots as claimed in claim 8, wherein the determining step b) determines a plurality of the virtual pages of data that are backed by the real memory storage frames, that have been changed in the virtual memory storage system, and for which no longer valid copies are backed in a plurality of the auxiliary storage slots, and the deleting stop c) deletes only a subset of the no longer valid copies from a subset of the plurality of the auxiliary storage slots in a single traversal of the queue, and remaining ones of the no longer valid copies are deleted from remaining ones of the plurality of the auxiliary storage slots in at least one subsequent traversal of the queue.

15. A program storage device readable by machine, tangibly embodying a program of instructions executable by the machine to perform method steps for freeing auxiliary storage slots in a computing system implementing a virtual memory storage system having real memory storage frames for storing virtual pages of data and an auxiliary storage system comprising auxiliary storage slots for storing copies of corresponding virtual pages provided in real memory storage frames, the method steps comprising:

a) periodically traversing a queue of page frame table entries with each entry indicating presence and location of the virtual pages of data in the virtual memory storage system; and during each traversal;

b) responsive to the traversing, determining whether at least one of the virtual pages of data that is backed in at least one of the real memory storage frames has been changed in the virtual memory storage system, and in response to determining that the at least one of the virtual pages of data has been changed in the virtual memory storage system, determining whether a no longer valid copy of the at least one of the virtual pages of data is backed in at least one of the auxiliary storage slots;

c) responsive to the determining, identifying the at least one of the auxiliary storage slots which backs the no longer valid copy, when it is determined that the at least one of the virtual pages of data has been changed and the no longer valid copy is backed in the at least one of the auxiliary storage slots; and, d) responsive to the identifying, deleting the no longer valid copy from the at least one of the auxiliary storage slots, when it is determined that the at least one of the virtual pages of data has been changed and the no longer valid copy is backed in the at least one of the auxiliary storage slots, thereby freeing the at least one of the auxiliary storage slots for use in a pool of available auxiliary storage slots.

16. The program storage device readable by machine as claimed in claim 15, wherein the page frame table entries include information indicating referenced virtual pages of data, the traversing step further comprising the steps of:

determining whether a stored virtual page of data in at least one of the real memory storage frames has been referenced since a prior time the stored virtual page of data has been processed; and, if so, placing at least one corresponding page frame entry at a back of the queue so that the stored virtual page of data, becomes a less desirable candidate to have its contents written to the auxiliary storage system in a steal operation.

17. The program storage device readable by machine as claimed in claim 16, further including the step of maintaining the queue of page frame table entries in least recently used order.

18. The program storage device readable by machine as claimed in claim 15, wherein the determining step b) further includes the step of executing an instruction for providing a condition code indicating whether the at least one of the virtual pages of data that is backed in the at least one of the real memory storage frames has changed.

19. The program storage device readable by machine as claimed in claim 15, wherein the step b) further includes the step of providing information in the page frame table entries for indicating whether the at least one of the virtual pages of data is backed in the at least one of the auxiliary storage slots.

20. The program storage device readable by machine as claimed in claim 15, wherein the identifying step c) further includes the step of retrieving an auxiliary slot token that identifies the at least one of the auxiliary storage slots.

21. The program storage device readable by machine as claimed in claim 15, wherein the determining step b) determines a plurality of the virtual pages of data that are backed by the real memory storage frames, that have been changed in the virtual memory storage system, and for which no longer valid copies are backed in a plurality of the auxiliary storage slots, and the deleting stop c) deletes only a subset of the no longer valid copies from a subset of the plurality of the auxiliary storage slots in a single traversal of the queue, and remaining ones of the no longer valid copies are deleted from remaining ones of the plurality of the auxiliary storage slots in at least one subsequent traversal of the queue.

* * * * *